Aug. 5, 1930.  S. A. SNELL  1,772,295
HEATER
Filed March 11, 1926
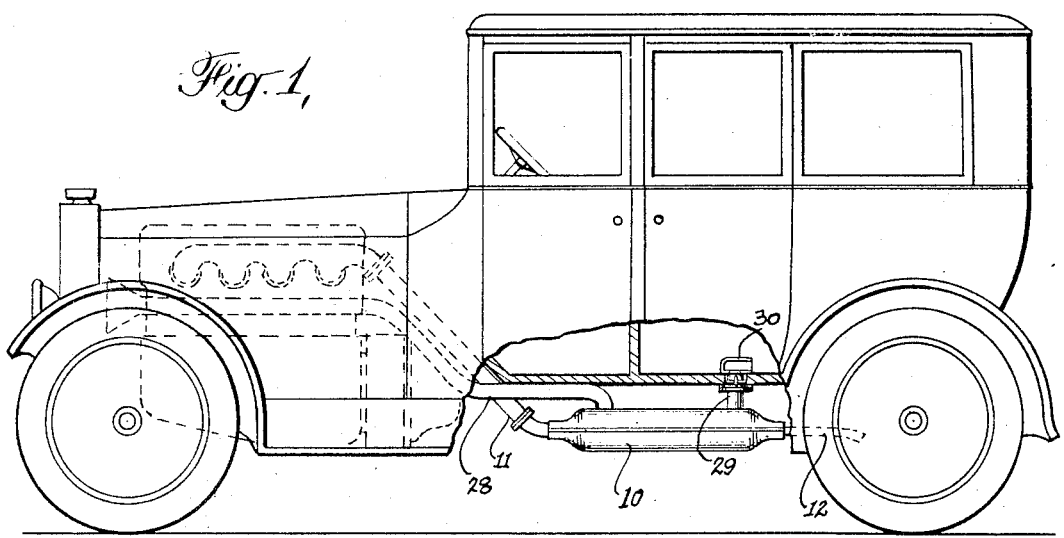
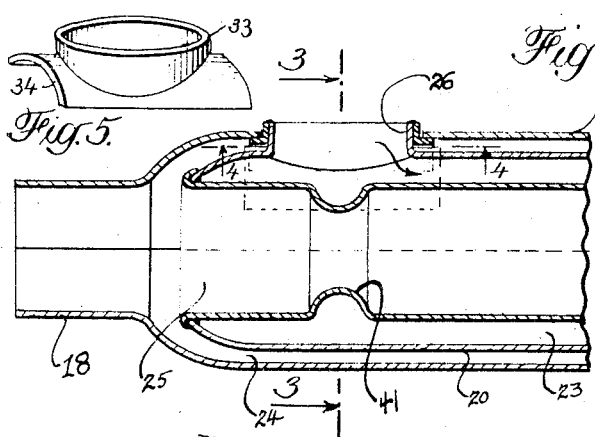
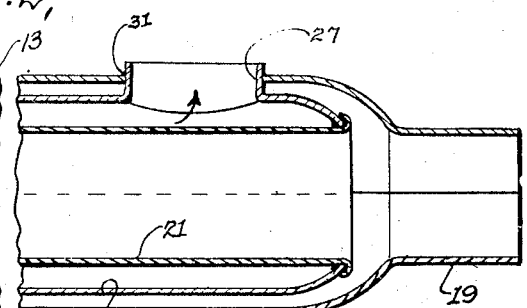
INVENTOR
Samuel A. Snell
BY
Pennie, Davis, Marvin & Edmonds
ATTORNEYS Patented Aug. 5, 1930

1,772,295

UNITED STATES PATENT OFFICE

SAMUEL A. SNELL, OF DETROIT, MICHIGAN, ASSIGNOR TO FREDERICK C. MATTHAEI, OF DETROIT, MICHIGAN

HEATER

Application filed March 11, 1926. Serial No. 93,845.

This invention relates to heating devices for use in motor cars of the type in which the exhaust gases from the motor are used to heat air which is discharged into the interior of the car through a suitable register.

The heater forming a part of the present invention comprises a casing or shell of tubular form which has inlet and outlet passages at its ends for the exhaust gases, and contains an annular air-chamber mounted within it and spaced from its wall so that the hot gases may pass both through and around the air-chamber. A tubular passage for air extending from the outer wall of the air-chamber through the wall of the shell admits air to the air-chamber through which it flows in a thin annular stream, during which it is heated by indirect contact with the exhaust gases, to another tubular passage which leads through the shell wall to a conduit extending to a register opening into the interior of the car. The air-chamber, which is formed of two concentric spaced tubes with their ends secured together air-tight, is mounted within the shell by means of the tubular passages which conduct air to and from the chamber.

A heater of this construction is well adapted for use on motor vehicles, it is highly efficient in operation, it may be produced in quantity at low cost, and it may be so constructed as to possess the high degree of strength required of such a heater to withstand the strains of vibration incident to operation of the vehicle and of expansion and contraction with severe changes of temperature.

A feature of the invention which is of great importance in securing the requisite strength consists in making the tubular inlet and outlet passages of the air-chamber integral with the outer wall of the chamber and of a length sufficient to extend through openings in the shell or casing. These tubular passages may be subjected to great strain as the heater is subject to wide changes of temperature and consequent expansion and contraction, and they must be capable of withstanding such strain since leakage of the gases into the air passages is very objectionable and might be productive of serious consequences.

The shell or casing of tubular form is preferably made of two parts divided longitudinally, each part being pressed into form from sheet metal by suitable dies. These parts are shaped to provide contracted ends, tubular extensions forming the inlet and outlet for the gases and edge flanges whereby the parts are secured together. This construction of the shell makes it possible to use the most desirable construction for the air-chamber, including the integral tubular inlet and outlet passages, facilitates the assembly of the parts and is in other respects entirely satisfactory.

As a further feature of the invention, provision may be made for offsetting or compensating for any inequalities which may occur in expansion and contraction of the parts and strains occasioned thereby. To this end a slip joint may be employed where one of the air passages passes through the outer shell. The provision of such a slip joint is desirable in some instances though its use is by no means essential, particularly as separation of the parts resulting in leakage of the gases to the outer air is unimportant unless such leakage is accompanied by noise. Also a circumferential bead may be provided in one or both of the tubes from which the air-chamber is formed. When such a bead is provided on the inner tube extending inwardly thereof it serves the additional purpose of restricting the passage through the annular air-chamber and thus diverting a desired proportion of the hot gases to the passage around the air-chamber.

The construction of the air-chamber is of great importance, particularly the construction employed at the ends thereof when the chamber is formed of two concentric spaced tubes. The ends of these tubes must be connected together by air-tight joints which will be proof against the entrance of gas into the air-chamber throughout years of service and the severe strains incident thereto. Preferably the end portions of the outer tube are curved inwardly to carry their ends under flanges on the ends of the inner tube and a sealing material such as spelter is caused to flow in around these edges to form a brazed joint of great strength and reliability.

In addition to the heater of improved construction, the present invention includes a register of novel form for discharging the heated air into the car body and this register is so arranged that the air is discharged over the entire floor of the car. The register is so constructed that it is capable of being readily mounted in position in the floor of the car and connected to the air conduit, and this connection is interrupted so that the register is not affected by the vibration of the conduit. In the heating devices of this general type heretofore in use, the air conduit has been directly connected to the register and consequently the conduit acts to transmit motor noises and noises caused by the passage of the exhaust gases through the exhaust pipe, into the car body. This air conduit has ordinarily been made of flexible metallic tubing which to some extent muffles or deadens the noise, but such tubing is expensive, unsightly, and cannot be bent on a small radius, as is sometimes necessary. Furthermore, it does not permit as free a flow of air as smooth wall tubing. Whenever smooth tubing, either seamless or welded, is employed, the noise is intensified and this has been an objectionable feature of heaters of this type.

In the present construction, the register and conduit are not directly connected, the register being provided with a flange which fits into a hole in the floor board of the car out of contact with the end of the conduit. The latter is secured to the floor board around the opening into which the flange projects, and a soft non-metallic washer is interposed between the flange and the board. With this arrangement, heated air cannot escape from the connection, but the transmission of noise from the heating device to the car is prevented and the mounting of the register is also greatly simplified.

The features of the invention above mentioned and various others will be better understood by reference to the following description read in connection with the accompanying drawings which show the preferred embodiment of the invention. In these drawings, Fig. 1 is a view showing a closed motor car in side elevation, conventionally illustrated, and with parts broken away to show the installation of the new heater, Fig. 2 is a longitudinal section through the new heater, Fig. 3 is a transverse section on the line 3—3 of Fig. 2, Fig. 4 is a section on the line 4—4 of Fig. 2, Fig. 5 is a perspective view of a part of the heater, and Fig. 6 is a sectional view through the end of the air-chamber showing the seal.

Fig. 7 is a sectional view through the register, and

Fig. 8 is a top view of the register, with a part broken away.

Referring now to the drawings, the heater 10 is shown connected to form a part of the exhaust line 11 from the motor of the car and connected at its rear end to the usual tail pipe 12. The heater includes a metal casing 13 generally of cylindrical shape. This casing is made of two longitudinal sections 14 and 15 stamped or otherwise formed to the desired shape. These members are provided with marginal flanges 16 and 17 one of which overlaps the other to form a tight joint. The two sections are shaped at their ends to form reduced necks 18 and 19 connected to the exhaust line and the tail pipe respectively.

Within the casing or shell 13 is an air chamber generally designated 20. This air chamber is made of an inner tube 21 and an outer tube 22 of greater diameter, the space 23 between the tubes forming an air chamber which is spaced from the inner wall of the casing so that gases entering through the neck 18 may flow through the casing in the annular passage 24 around the chamber and also through the central passage 25 through the chamber.

At spaced points near the opposite ends of the air chamber portions of the outer wall are extruded as indicated at 26 and 27, forming integral tubular extensions from the outer tube 22. The extension 26 is the air inlet and is connected to an intake pipe 28 leading to any convenient point of the car and the extension 27 is the outlet, connected by a pipe 29 to the register 30 in the floor of the car body. The extension 27 passes through an opening in the wall of the casing and is secured thereto by a line of welding 31.

In the assembling of the parts, the air chamber is first assembled and the extension 27 is then inserted in an opening in the upper heater section 14. The casing has another opening 32 near its forward end through which the extension 26 is to project, and to simplify the operation and to provide a joint which will allow a certain amount of relative movement between the parts, the opening 32 is of somewhat greater diameter than the extension 26 and if desired may be made slightly oval in shape. Within this opening 32 is first inserted a sleeve 33 to one end of which is secured an arcuate plate 34 conforming generally to the inner surface of the casing wall adjacent the opening and of sufficient extent to overlie the edges of the opening. After the sleeve is in place, plates 35 are secured to the inner wall of the casing by welding, these plates having off-set portions 36 which overlie the edges of the arcuate plate 34. When these parts are in position, the tubular extension 26 is inserted into the sleeve and is secured thereto in any convenient way as for instance by welding the two parts at their top edges as indicated at 37. With this arrangement the air chamber is secured rigidly to the casing by the line of welding 31 but is secured at its other end by a slip joint mounting to which the extension 26 is attached. This arrangement not only permits relative expansion of the air chamber and casing without causing a detachment of the parts but also simplifies the construction and assembling of the parts because the openings in the casing wall through which the extensions 26 and 27 are to project need not be so accurately formed as would otherwise be the case. Furthermore, the extension 26 may readily be inserted into the sleeve 33 as the latter is free to move in its slip joint mounting in the opening 32 to the extent necessary to accommodate the insertion of the extension. As the plate 34 always closes the opening 32 no leakage of gas through this opening can occur.

With this arrangement the air chamber is securely mounted on the casing wall, relative expansion and contraction of the parts is permitted and by reason of the extensions being integral with the air chamber wall, no leakage resulting in a mingling of gases with the air can occur.

The tube 22 which constitutes the outer wall of the air chamber is of slightly less length than the inner tube 21 and after the tubes have been placed in proper relation, the ends 38 of the inner tube are bent rearwardly over the ends of the outer tube to form a peripheral channel (Fig. 6). In this channel is placed a measured quantity of spelter through the tubular extensions 26 or 27 as the case may be. The ends of the tubes are now subjected to heat which causes the spelter to melt and it flows to fill the channel and thus forms a sealing layer 39 into which the ends 40 of the inner tube project. This insures that the two tubes will be securely attached and will be sealed against leakage of air or gases. In the construction of these parts as heretofore carried on the edges of the two tubes have been united by a welding operation and while this is satisfactory if carefully done, it is found that inattention on the part of the workmen will occasionally result in the seal being imperfect. This results in leakage of gases into the air chamber and the mingled air and gases are then introduced into the car.

In order to allow for a slight relative expansion and contraction between the inner and outer tubes 21 and 22 forming the air chamber, the inner tube is formed with an inwardly extending bead 41 preferably at a point opposite the extension 26 and this bead serves to partially constrict the passage 25 through the inner tube. This passage has a greater cross sectional area than the annular passage 24 and accordingly, without the constriction, a greater quantity of gas would flow through it and this would cause a greater expansion of the inner tube than of the outer tube. The presence of the bead permits relatively greater expansion of the inner tube than the outer tube without setting up strains which would cause the breaking of the seal but in addition the bead reduces the effective area of the passage 25 so that a more equal division of the gases between the passage 24 and 25 takes place. This even distribution results in a more effective heat absorption through the tube walls and insures that the air passing through the chamber will be rapidly raised in temperature.

The improved register used with this heating device consists of a plate 42 to which is secured a circular flange 43, the flange extending downwardly from the plate and defining a passage 44. The flange is slotted at 45 and provided with a terminal bead 46 of slightly enlarged diameter. In mounting this register, an opening is made in the floor carpet 47 and a similar opening 48 is made through the floor board 49. The opening 48 is of slightly less diameter than the bead 46, and the flange is of such length that when the register is in place with the flange inserted in the opening, the end of the flange lies above the lower surface of the floor board 49. The plate 42 is of generally triangular form, as indicated in Fig. 8, and terminates in an overhanging top plate 50, also of generally triangular shape. When the register is in position in the floor opening, it rests upon the carpet, as shown in Fig. 7, and the carpet forms a sound-deadening pad.

The outlet conduit 29 has a lateral flange 51 at its end, and this flange is secured to the floor board 49 by wood screws. A washer 52 is interposed between the flange and the floor board. With this arrangement, the vibration and rattling of the heater and the motor noises and noises of the explosions are not transmitted to the register, since there is a non-metallic connection between the end of the flange of the register and the end of the air outlet conduit 29. Also, this register, owing to the shape of the upper plate, deflects the air along the floor surface and distributes it to all parts of the floor, thus heating the interior of the car uniformly. Since the register is held in place frictionally, it may readily be removed, as, for example, during the summer, and a suitable plug may be placed in the hole in which the register is usually mounted.

This connection of the register with the heater permits the use of smooth tubing, which may be bent at any angle necessary by reason of the conditions of the installation. At the same time, the noises ordinarily transmitted through the direct connection between the heater and register are absorbed in the sound-deadening pads.

I claim:

1. A heater for motor vehicles comprising the combination of a shell having inlet and outlet connections for gases at its ends, an annular air-chamber mounted within and spaced from the shell whereby gases may flow through and around the chamber, tubular conduits for air extending from the air chamber through the wall of the shell, and a slip joint between one of the tubular conduits and the shell.

2. A heater for motor vehicles comprising the combination of a shell having inlet and outlet connections for gases at its ends, an annular air-chamber mounted within and spaced from the shell whereby gases may flow through and around the chamber, tubular conduits for air extending from the air-chamber through openings in the wall of the shell, a sleeve in one of the openings receiving the conduit, and a slip joint mounting for this sleeve in the shell wall.

3. A heater for motor vehicles comprising the combination of a shell having inlet and outlet connections for gases at its ends, an annular air-chamber mounted within and spaced from the shell whereby gases may flow through and around the chamber, tubular conduits for air extending from the air-chamber through openings in the wall of the shell, a sleeve loosely fitting into one of the openings and enclosing the conduit, an arcuate plate secured to the end of the sleeve and serving to close the opening around the sleeve, and plates secured to the inner wall of the shell for supporting the arcuate plate while allowing it a limited freedom of movement.

4. A heater for use in motor cars comprising the combination of a tubular shell having an inlet and an outlet for gases at its ends, an annular air-chamber within the shell formed of concentric spaced tubes, one of these tubes having end flanges overlying the ends of the other tube and forming peripheral channels, sealing material in the channels sealing the joints between the tube ends, and air inlet and outlet connections to the air-chamber extending through the shell walls.

5. A heater for motor vehicles comprising the combination of a shell of generally cylindrical form contracted at its ends to form aligned inlet and outlet openings of substantially the same diameter for the heating gases, an annular air chamber within the shell formed of two lengths of tubing of different diameters arranged concentrically, the inner length of tubing having an inner diameter at its ends substantially equal to the diameter of said openings and being disposed with its ends aligned with said openings, the outer length of tubing having its ends contracted to conform with the contracted ends of the shell and united to the ends of the inner length of tubing by gas-tight joints, inlet and outlet connections for the air chamber passing through the cylindrical wall of the shell and secured thereto and forming the sole support for mounting the air chamber concentrically within the shell, and means for compensating for unequal expansion of the aforesaid parts of the heater.

6. A heater for motor vehicles comprising the combination of a shell of generally cylindrical form contracted at its ends to form aligned inlet and outlet openings of substantially the same diameter for the heating gases, an annular air chamber within the shell lying with its longitudinal axis co-incident with the centers of said openings, said shell being formed of two lengths of tubing of different diameters arranged concentrically, said inner length of tubing having substantially the same diameter at its ends as said openings, the outer length of tubing having its ends contracted to conform with the contracted ends of the shell and united to the ends of the inner length of tubing by gas-tight joints, tubular connections to and from the air chamber formed integral with the outer wall of the air chamber and passing through openings in the shell and secured to the shell to support the air chamber concentrically within the shell, and means for compensating for unequal expansion of the shell and the tube walls of the air chamber.

In testimony whereof I affix my signature.

SAMUEL A. SNELL.